US009000106B2

(12) United States Patent
Lawson et al.

(10) Patent No.: US 9,000,106 B2
(45) Date of Patent: Apr. 7, 2015

(54) COPOLYMER PRODUCTION SYSTEM AND PROCESS

(71) Applicant: ExxonMobil Chemical Patents Inc., Baytown, TX (US)

(72) Inventors: Kevin W. Lawson, Houston, TX (US); Rodney S. Smith, Edinburgh (GB)

(73) Assignee: ExxonMobil Chemical Patents Inc., Houston, TX (US)

( * ) Notice: Subject to any disclaimer, the term of this patent is extended or adjusted under 35 U.S.C. 154(b) by 135 days.

(21) Appl. No.: 13/845,921

(22) Filed: Mar. 18, 2013

(65) Prior Publication Data

US 2013/0296506 A1 Nov. 7, 2013

Related U.S. Application Data

(60) Provisional application No. 61/641,451, filed on May 2, 2012.

(51) Int. Cl.
*C08F 2/01* (2006.01)
*C08F 2/38* (2006.01)
*B01J 19/18* (2006.01)
*C08F 2/00* (2006.01)
*C08F 210/16* (2006.01)

(52) U.S. Cl.
CPC ... *C08F 2/01* (2013.01); *C08F 2/00* (2013.01); *Y10S 526/905* (2013.01)

(58) Field of Classification Search
USPC ........... 526/65, 905, 68; 525/52, 53; 422/134; 585/255
See application file for complete search history.

(56) References Cited

U.S. PATENT DOCUMENTS

| 4,851,488 | A  | * | 7/1989  | Burstain ......................... 526/78 |
| 6,221,982 | B1 | * | 4/2001  | Debras et al. ................... 526/64 |
| 7,851,554 | B2 |   | 12/2010 | Meka et al. |
| 7,960,486 | B2 | * | 6/2011  | Aso et al. ........................ 526/82 |

* cited by examiner

*Primary Examiner* — Fred M Teskin
(74) *Attorney, Agent, or Firm* — Chad A. Guice

(57) ABSTRACT

In a process for making a copolymer, a first product stream comprising a semi-crystalline polymer and a chain terminating agent is produced in a first reactor system. The first product is provided to a second reactor system wherein a low crystallinity polymer is produced in the presence of the semi-crystalline polymer. At least a portion of the chain terminating agent is removed from the second reactor system by an in-situ process.

17 Claims, 4 Drawing Sheets

COPOLYMER PRODUCTION SYSTEM AND PROCESS

PRIORITY CLAIM

The present application claims priority to and the benefit of U.S. Ser. No. 61/641,451, filed on May 2, 2012 and entitled, "Copolymer Production System and Process," the disclosure of which is hereby incorporated by reference herein in its entirety.

BACKGROUND OF THE INVENTION

Embodiments relate to production systems and methods to produce olefin copolymers such as copolymers in which a low crystallinity polymer is formed in the presence of a semi-crystalline polymer.

Impact copolymers ("ICPs") are generally produced in a series of polymerization reactors, such as, for example, as disclosed in U.S. Pat. No. 7,851,554, which is hereby incorporated herein by reference. Briefly, a polypropylene reactor system, such as, for example, a slurry bulk propylene loop reactor or reactors, forms a homopolymer ("hPP") matrix, followed by a second reactor system in series, such as, for example, a gas phase fluidized bed reactor(s) ("GPR"), where an ethylene-propylene biopolymer (e.g., an ethylene propylene rubber ("EPR")), is formed in the presence of the matrix, for example, within the pores of the matrix.

The close-coupled continuous nature of this process often imposes limitations on the quality of the EPR that can be formed in the GPR; for example, the maximum molecular weight ("MW") of the EPR is often limited by the amount of chain terminating agent, e.g., hydrogen, that is carried over from the slurry bulk propylene loop reactor(s) into the GPR. The ratio of MW between the EPR and the hPP matrix as determined by intrinsic viscosity measurements ("IV ratio" or "IVR"), is often used to characterize the ICP product and has significant impact on the product processing and final application properties.

Special equipment and additional energy are required between the slurry bulk propylene loop reactor(s) and GPR to perform a low pressure separation to remove this excess hydrogen if it is desired to produce high MW EPR. As used herein, a "low pressure separation" is one that occurs at a pressure below the operating pressure of the GPR so that it becomes necessary to re-pressurize the polymer feed to the GPR. Process units without this equipment may not be capable of producing high MW EPR in the GPR. Moreover, even when an ICP line has the necessary hydrogen separation equipment, GPR transitions to high MW EPR conditions, i.e., low hydrogen concentration in the GPR, can take a relatively long time and generate large quantities of non-spec product for as much as 12 to 24 hours or more. Furthermore, regardless of the hydrogen removal equipment, it can be difficult to control the level of chain terminating agent in the GPR to obtain the desired molecular weight.

There is a need in the art for production systems and methods to transfer more quickly to high MW EPR conditions, and/or in which control of the chain terminating agent concentration and thus the EPR MW is facilitated.

SUMMARY OF THE INVENTION

In accordance with an embodiment, a process for making a copolymer comprises:

(a) producing in a first reactor system a first product stream comprising a semi-crystalline polymer and a chain terminating agent;
(b) providing at least a portion of the first product stream to a second reactor system;
(c) producing in the second reactor system a low crystallinity polymer in the presence of the semi-crystalline polymer; and
(d) removing at least a portion of the chain terminating agent introduced with the first product stream from the second reactor system by an in-situ process.

In accordance with an embodiment, a process comprises producing a semi-crystalline polymer in a first reactor system, transferring a product effluent stream from the first reactor system to a second reactor system comprising a monomer circuit to recirculate monomer through a reactor in the second reactor system to form a low crystallinity polymer in the presence of the semi-crystalline polymer, and removing chain terminating agent, e.g., molecular hydrogen, from a slipstream circuit in recirculating communication with the monomer circuit.

In accordance with an embodiment, a process unit comprises a first reactor system to produce a semi-crystalline polymer, a transfer unit to transfer a product effluent stream from the first reactor system to a second reactor system to form a low crystallinity polymer in the presence of the semi-crystalline polymer, a monomer circuit to recirculate monomer through a reactor in the second reactor system, and a slipstream circuit comprising a chain terminating agent removal unit in recirculating communication with the monomer circuit to remove chain terminating agent, e.g., molecular hydrogen, from the second reactor system.

DETAILED DESCRIPTION

Figure 1:
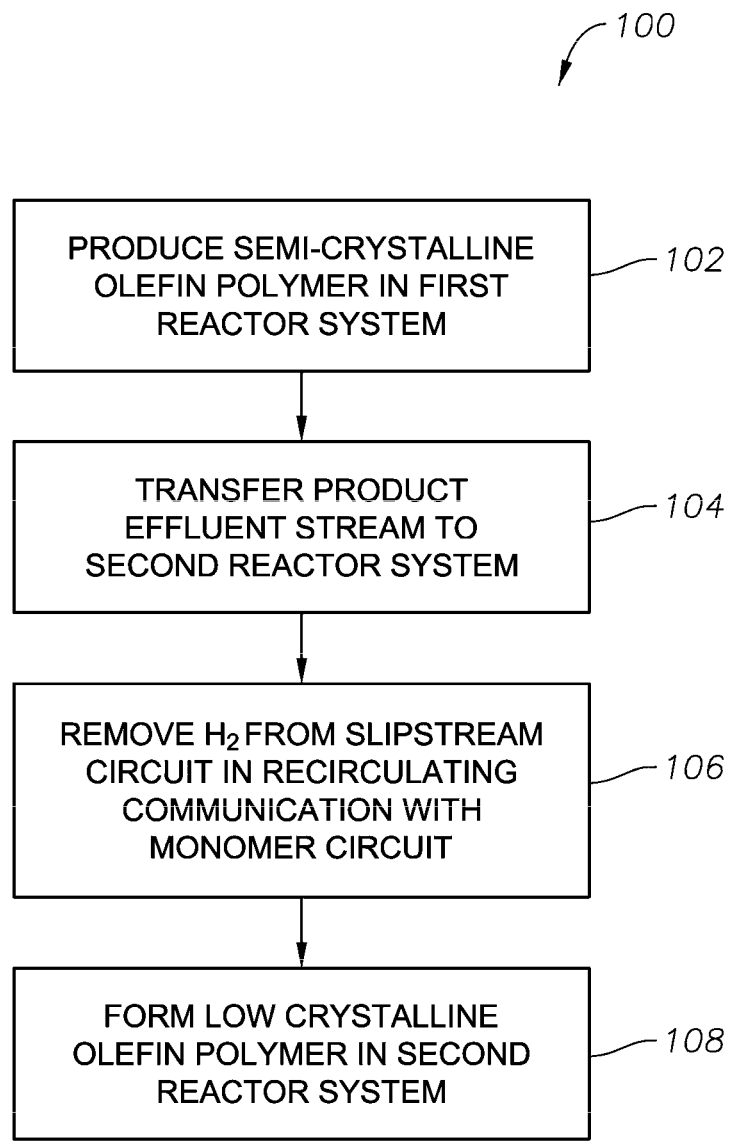
FIG. 1 is a schematic flow diagram of a process according to an embodiment.

Various specific embodiments, versions and examples of the invention will now be described, including preferred embodiments and definitions that are adopted herein for purposes of understanding the claimed invention. However, for purposes of determining infringement, the scope of the "invention" will refer to the appended claims, including their equivalents, and elements or limitations that are equivalent to those that are recited. All references to the "invention" below are intended to distinguish claimed apparatuses and methods from apparatuses and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

GENERAL DEFINITIONS

As used herein, the new numbering scheme for the Periodic Table of Elements Groups is used as described in HAWLEY'S CONDENSED CHEMICAL DICTIONARY, p. 852 (John Wiley & Sons, 13th ed. 1997).

As used herein, the term "polymer(s)" refers to homopolymers, copolymers, terpolymers, and interpolymers.

As used herein, unless differentiated, "polymerization" includes homopolymerization, copolymerization, terpolymerization, and interpolymerization.

As used herein, when a polymer is referred to as comprising a monomer, the monomer is present in the polymer in the polymerized form of the monomer or in the derivative form of the monomer.

As used herein, "molecular weight" means weight average molecular weight (Mw). Mw is determined using gel permeation chromatography (GPC). Molecular weight distribution (MWD) means Mw divided by number average molecular weight (Mn). For more information, see U.S. Pat. No. 4,540,753 to Cozewith et al., and references cited therein, and in Verstrate et al., 21 *Macromolecules* 3360 (1998). The "Mz" value is the high average molecular weight value, calculated as discussed in A. R. Cooper, CONCISE ENCYCLOPEDIA OF POLYMER AND ENGINEERING, pp. 638-39 (J. I. Kroschwitz, ed. John Wiley & Sons, 1990).

As used herein, melt flow rates (MFR) are determined in accordance with ASTM D 1238-95 Condition L (2.16 kg, 230° C.). In general, MFR is inversely related to Mw, i.e., high MFR indicates low Mw.

As used herein, "crystalline" is defined as having identifiable peak melting points above about 100° C. as determined by differential scanning calorimetry (DSC peak melting temperatures).

As used herein, plurality refers to two or more.

As used herein, method and process are used interchangeably.

The terms "polypropylene polymer(s)" and "propylene polymer(s)" refer to homopolymers, copolymers, terpolymers, and interpolymers made from propylene derived units, or combinations of these. The term "polypropylene" may be defined to mean any propylene based polymer having a propylene content of at least 80 wt %. As used herein, "polypropylene" in embodiments can include homopolymers of propylene derived units and copolymers of propylene derived units comprising within the range from 0.1 to 1 or 3 or 5 wt %, by weight of the copolymer, of ethylene or $C_4$ to $C_{10}$ α-olefin derived units, ethylene derived units in a particular embodiment.

In certain embodiments, the polypropylene(s) are isotactic. As used herein, "isotactic" is defined as having at least 40% isotactic pentads according to analysis by $^{13}$C-NMR. Isotacticity of the propylene sequences in polypropylene can be achieved by polymerization with the choice of a desirable catalyst composition. In one embodiment, the isotacticity of the polypropylene(s) as measured by $^{13}$C NMR, and expressed as meso diad content is greater than 90% (meso diads [m]>0.90) or 95% or 97% or 98% in certain embodiments, determined as in U.S. Pat. No. 4,950,720 by $^{13}$C NMR. Expressed another way, the isotacticity of the polypropylenes as measured by $^{13}$C NMR, and expressed as pentad content, is greater than 93% or 95% or 97% in certain embodiments.

In one embodiment, the polypropylene(s) comprises an overall MFR with a lower limit of about 8 or 10 or 20 or 30 or 40 or 50 or 60 or 70 or 80 or 90 or 100 and an upper limit of about 150, 200, 300 or 400 dg/min, e.g., 8 to 400 dg/min, 100 to 200 dg/min, 70 to 300 dg/min, or 40 to 150 dg/min.

As used herein, the intrinsic viscosity (IV) for the polypropylene homopolymer or copolymers of propylene with alpha-olefins with 2 or 4 to 12 carbon atoms is determined according to the procedure of ASTM D2857. The term "intrinsic viscosity" is used to indicate the viscosity of a solution of a material, in this case a solution of a polymer, in a given solvent at a given temperature, when the polymer composition is at infinite dilution. Its measurement involves a standard capillary viscosity measuring device, in which the viscosities of a series of concentrations of the polymer in the solvent at the given temperature are determined. In the case of the polymers herein, decalin (decahydronaphthalene) is an illustrative suitable solvent and a typical temperature is 135° C. From the values of the viscosity of solutions of varying concentration, the "value" at infinite dilution can be determined by extrapolation.

The present invention, including any of its embodiments, may be employed to produce polymeric compounds known in the art as impact copolymers. As used herein, the term "impact copolymer" or ICP shall refer to blends of polypropylene and rubber which are substantially thermoplastic. The ICPs have a "homopolymer component," which may also be referred to in some embodiments as a "polypropylene component" or as a "semi-crystalline polymer component" or as "hPP," and a "rubber component" which may also be referred to in some embodiments as "EPR" or as a "copolymer component" or as a "low crystallinity polymer component." Impact copolymers are commonly used in a variety of applications where stiffness and impact resistance are desired such as molded and extruded automobile parts, household appliances, luggage and furniture, etc. Propylene homopolymers are often unsuitable for such applications because they are too brittle and have low impact resistance particularly at lower temperatures, whereas propylene impact copolymers are well suited for applications such as these.

An impact copolymer or heterophasic copolymer or block copolymer generally contains at least two phases or components, a homopolymer component or continuous matrix and a copolymer component or dispersed phase. In embodiments, the polypropylene phase may be continuous or nearly continuous. These two components can be produced in a sequential polymerization process wherein the homopolymer produced in a first reactor system is transferred to a second reactor system where elastomeric polymer is produced and incorporated within the matrix of the homopolymer component. The elastomeric polymer component has "rubbery" characteristics and provides the desired impact resistance, whereas the homopolymer component provides overall stiffness.

In some embodiments, the rubber phase exists in discrete domains dispersed throughout the polypropylene polymer phase. Most commonly, the rubber will be an ethylene-propylene rubber or an ethylene-propylene terpolymer rubber; however, other rubber compositions may be used. The terms "rubber," "elastomer" and "elastomeric polymer" are synonymous and can be defined as any low crystalline, or essentially non-crystalline, polymeric component having a low glass transition temperature, e.g., ~−35° C. or less, and in some embodiments is a copolymer of propylene derived units and at least one other monomer derived unit selected from ethylene and at least one $C_4$ to $C_{12}$ α-olefin. In one embodiment the rubber phase comprises a material that can stretch and recover such that it exhibits an ultimate tensile strength of greater than 5.5 MPa, an ultimate elongation of at least 200% and tension set of less than 20% at 100% deformation, as determined by ASTM D412. Non-limiting examples of elastomeric polymers include natural rubber (NR), synthetic polyisoprene (IR), butyl rubber (co-polymer of isobutylene and isoprene, IIR), halogenated butyl rubbers (chloro-butyl rubber: CIIR; bromo-butyl rubber: BIIR), poly butadiene (BR), styrene-butadiene rubber (SBR), nitrile rubber, hydrogenated nitrile rubbers, chloroprene rubber (CR), polychloroprene, neoprene, EPM (ethylene-propylene rubber) and EPDM rubber (ethylene-propylene-diene rubber), epichlorohydrin rubber (ECO), polyacrylic rubber (ACM, ABR), silicone rubber, fluorosilicone rubber, fluoroelastomers, perfluoroelastomers, polyether block amides (PEBA), chlorosulfonated polyethylene (CSM), ethylene-vinyl acetate (EVA), thermoplastic elastomers (TPE), thermoplastic vulcanizates (TPV), thermoplastic polyurethane (TPU), thermoplastic olefins (TPO), polysulfide rubber, and blends thereof. In certain embodiments, the elastomeric polymer is ethylene-propylene rubber. The elastomeric polymer may be cured or uncured, preferably uncured.

Propylene impact copolymers are generally used in materials handling applications such as pallets and crates, for example, where good creep resistance and impact properties are required. Creep resistance is the property of deformation under load conditions. The creep resistance is proportional to the stiffness (e.g., flexural modulus) of the product and inversely related to the product MFR. Namely, the creep is lower with higher stiffness product, and is lower with lower MFR or high Mw product. For example, ICPs may refer to those blends of polypropylene and rubber polymers which are substantially thermoplastic and have a flexural modulus in the range of 70 to 2000 MPa (10,000 to 290,000 psi).

In general, the time required to mold a single part by injection molding, referred to as the cycle time, is high with low MFR products (e.g., less than 4 dg/min) and thus higher MFR products are generally used to achieve lower cycle time since it is much easier to fill out the mold in comparison to a low MFR ICP. In addition, high impact resistance, which in impact copolymers is a function of the ethylene-propylene rubber content, is especially desirable for articles such as pallets and crates having a surface contacting face and a load carrying face with a space therebetween for accepting a carrier such as a forklift, etc. Both surfaces must be strong enough to carry loads of about 227 to 545 kg (500 to 1200 lbs) or more at temperatures as low as −10° C., yet the composition used to make the injection molded pallet must have an adequately high MFR to allow rapid cycle time production. The high MFR ICP product in turn requires an even higher MFR polypropylene matrix in comparison to a low MFR ICP. For example, a 10 dg/min ICP, with about 18 wt % ethylene-propylene rubber (EPR) requires a matrix polypropylene having an MFR of approximately 20 dg/min versus only about 8 dg/min polypropylene for a 4 dg/min ICP. Due to the much lower polypropylene MFR in the 4 MFR ICP as compared to the 10 MFR ICP, the creep resistance is significantly better with the 4 MFR ICP.

In some embodiments, ICPs have a polypropylene content in the range of 40 wt % to 96 wt % or from 50 wt % to 90 wt %; and a rubber content in the range of 0.1 wt % to 60 wt % in one embodiment, and a rubber content of 0.1 wt % to 40 wt % in another embodiment. The rubber may include up to 100 wt % ethylene derived units or other $C_3$ to $C_{12}$ α-olefin derived units by weight of the rubber, or from 0.5 to 100 wt % ethylene derived units or other $C_3$ to $C_{12}$ α-olefin derived units by weight of the rubber in another embodiment, or from 0.5 to 60 wt % ethylene derived units or other $C_3$ to $C_{12}$ α-olefin derived units in yet another embodiment.

In certain embodiments, the propylene impact copolymer comprises a proportion of the elastomeric copolymer which is made in the second reactor system within the range of from a lower limit of 2, 4, 6, 8, 10, 12, 15, 20, or 22 wt %, up to a higher limit selected from 8, 10, 12, 15, 20, 22, 26, 30, or 35 wt %, based on the total weight of the propylene impact copolymer, e.g., 2 to 15 wt %, 4 to 12 wt %, 8 to 20 wt %, 20 to 30 wt %, or the like. The elastomeric polymer is an ethylene-propylene copolymer in a particular embodiment comprising within the range from 35 or 40 or 45 to 55 or 60 or 65 or 70 wt %, by weight of the copolymer, of ethylene-derived units, e.g., 35 to 55 wt %, 40 to 60 wt %, 45 to 70 wt % or the like. In a more particular embodiment, the elastomeric polymer is uncured; stated another way, curing agents as are known in the art are absent from the elastomer portion of the ICP, or preferably from the entire ICP. In yet another embodiment, cross-linkable monomer units are absent from the elastomeric polymer; the elastomeric polymer consisting essentially of an ethylene-propylene copolymer in a particular embodiment.

As used herein, the intrinsic viscosity ratio (IVR or IV ratio) refers to the ratio of the IV of the copolymer or rubber phase in the ICP to that of the homopolymer or polypropylene matrix, i.e., $IVR = IV_R/IV_{PP}$. Where the ICP is reactor produced in-situ, the intrinsic viscosity of the elastomeric portion of the ICP, synthesized in the second reactor system in the presence of the homopolymer portion (hPP), cannot be measured directly. In this case, the hPP is initially produced and the IV of that portion is measured directly using a standard capillary viscosity measuring device as described above, and the IV of the total ICP product is determined in a similar fashion. Then the IV for the rubber phase or copolymer or terpolymer (e.g., EPR) in the ICP can be calculated using the following equation:

$$IV_R = [IV_{ICP} - (1-Fc)IV_{PP}]/Fc$$

where, Fc is the fraction of the copolymer or terpolymer or other rubber in the ICP. The fraction of the copolymer or terpolymer is determined by conventional procedures, including infrared spectroscopy analysis, low field solid state nuclear magnetic resonance spectroscopy (LF NMR) or fractionation of the ICP in hot xylene into soluble and insolubles fractions, followed by analysis of the fractions by $^{13}C$-NMR.

As used herein, "high IVR" refers to an IVR greater than 1, or equal to or greater than 1.5, 1.75, 1.8, 2, 2.1, 2.15, 2.2, 2.25, 2.3, 2.5, 2.7, 3, 3.5, 4, 4.5, 5, 5.5, 6, 6.5, 7, 7.5, 8, 8.5, 9, 9.5, or 10. To achieve the balance between ICP MFR, creep resistance and impact resistance, the IVR in an embodiment is relatively high, e.g., equal to or greater than 1.5, 1.75, 1.8, 2, 2.1, 2.15, 2.2, 2.25, 2.3, 2.5, 2.7, 3, 3.5, 4, 4.5, 5, 5.5, 6, 6.5, 7, 7.5, 8, 8.5, 9, 9.5, or 10. In a particular embodiment, the IVR is within the range from a lower limit of 1 or 1.50 or 1.75 or 1.80 or 2.70 or 3 or 4 or 5 or 6 to a higher upper limit selected from 1.50 or 1.75 or 1.80 or 2.70 or 3 or 4 or 5 or 6 or 7 or 8 or 9 or 10, e.g., 1.5 to 2.7, 2.7 to 5, 5 to 9, 7 to 10, or the like.

In certain embodiments, the ICP is characterized by possessing an MFR within the range from 6 or 8 or 9 to 13 or 15 or 18 dg/min; a 1% secant flexural modulus of greater than 1030 MPa (150 kpsi); and an Izod impact at 25° C. of greater than 530 J/m (10 ft-lbs/in.).

The ICP, described in some additional or alternative embodiments, can be further characterized by possessing an instrumented impact (2.24 m/s at −29° C.) of greater than 47 J (35 ft-lbs), a tensile at yield of greater than 21.4 MPa (3100 psi), a Gardner impact (−29° C.) of greater than 34 N-m (300 in.-lbs), or a combination of any two or more of these properties.

As used herein, "additives" in the ICP can include, for example, stabilizers, surfactants, antioxidants, anti-ozonants (e.g., thioureas), fillers, colorants, nucleating agents, anti-block agents, UV blockers/absorbers, co-agents (cross-linkers and cross-link enhancers), hydrocarbon resins (e.g., OPPERA resins), and slip additives and combinations thereof. Primary and secondary antioxidants include, for example, hindered phenols, hindered amines, and phosphates. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art. In certain embodiments, cross-linkers and cross-link enhancers are absent from the propylene impact copolymers.

As used herein, a "nucleating agent" is any compound or blend of compounds whose overall concentration is less than 0.50 wt %, by weight of the polymer or blend to which it is added, that reduces the crystallization half time at 135° C. by at least 50%. Non-limiting examples of nucleating agents include bicyclo[2.1.1]heptane-2,3-dicarboxylic acid (cadmium or disodium salt), bicyclo[2.1.1]hept-5-ene-2,3-dicarboxylic acid (cadmium or disodium salt), amorphous silicon dioxide, metal oxides, aluminum salts, talc, silica and surface-modified silica, dibenzyl sorbitol, adipic acid, benzoic acid, sodium benzoate, 2-mercaptobenzimidazol, potassium dehydroabietate, sodium 2,2-methylene-bis-(4,6-di-tert-butylphenyl phosphate), N,N-dicyclohexyl-2,6-naphthalene dicarboxamide, 1,3:2,4-bis(3,4-dimethylbenzylidene)sorbitol, and blends thereof. In a particular embodiment, the nucleating agent is a composition comprising silicon dioxide, an alkyl amine and an alkyl-di-carboxylic acid compound (e.g., bicyclo[2.1.1]hept-5-ene-2,3-dicarboxylic acid). The propylene ICPs may include within the range from 0.001 or 0.005 to 0.05 or 0.10 or 0.5 wt %, by weight of the impact copolymer, of a nucleating agent or blend thereof, or stated another way, within the range from 200 or 300 to 1300 or 1500 ppm.

As used herein, a reactor system refers to a system comprising one or a plurality of parallel or series reactors used to make one of the phases of the ICP and all other necessary and optional equipment for the polymerization of olefins in the reactor or reactor(s).

In one embodiment, the ICP is produced in-situ within at least two reactor systems. In one embodiment, a first reactor system refers to a system for the production of the semi-crystalline polymer (e.g., polypropylene or homopolymer propylene), such as, for example, propylene loop reactor(s), and a second reactor system refers to a system for the production of the low-crystallinity polymer or rubber or ethylene-propylene copolymer in the presence of the semi-crystalline polymer, such as, for example, a gas phase reactor (GPR). The reactor systems may operate in separate stages to produce one or more of the components, e.g., polypropylene in a first reactor system and/or elastomer in a second reactor system comprising a slipstream circuit to remove chain terminating agent.

In an embodiment, the propylene ICP is produced in-situ within at least two reactor systems associated in series, and in a particular embodiment is produced in-situ in first and second reactor systems wherein the first reactor system comprises two reactors operated in series and wherein the second reactor system comprises another reactor system associated in series and a slipstream circuit to remove chain terminating agent. When two or three or more reactors are used in two or more reactor systems, the same catalyst composition may be used throughout, or separate catalyst compositions may be used at each reactor and/or reactor system or the catalyst composition may be modified at any reactor and/or reactor system.

Unless otherwise specified, reactor systems or reactors within a reactor system may be connected in parallel or series. In certain embodiments, reactor systems or reactors within a reactor system are in fluid communication regardless of the hardware applied, such as pipes, conduits, transfer systems, etc.

One or more catalyst compositions are typically used in the various reactors of the reactor systems to polymerize the monomers and optional comonomers, where the catalyst typically includes a transition metal component and an electron donor and/or co-catalyst component(s). In embodiments where one or more reactors are used to produce the propylene impact copolymer(s), chain terminating agent(s) (e.g., hydrogen) may be used in the first reactor system to control the MFR (i.e., molecular weight) of the polypropylene(s). The chain terminating agents may be used as a means of adjusting the MFR of components of the ICP either alone or in conjunction with other means. As used herein, a "chain terminating agent" is a component such as hydrogen, for example, present in the reactor(s) to terminate the growth of the polymer chain, and whose concentration is controlled in the reactor by addition and/or removal to control the molecular weight of the polymer formed in the reactor. Hydrogen may be referred to below as only one non-limiting example of a chain terminating agent.

In an embodiment, the method for producing a copolymer (e.g., an ICP) comprises:
(e) producing in a first reactor system a first product stream comprising a semi-crystalline polymer and a chain terminating agent;
(f) providing at least a portion of the first product stream to a second reactor system;
(g) producing in the second reactor system a low crystallinity polymer in the presence of the semi-crystalline polymer; and
(h) removing at least a portion of the chain terminating agent introduced with the first product stream from the second reactor system by an in-situ process.

The "in-situ process" may include any process in which the chain terminating agent is removed within the second reactor system. For example, the in-situ process may include a catalytic hydrogenation reaction to consume hydrogen via reaction with monomer or a membrane unit to selectively remove the chain terminating agent from the reaction system.

In a particular embodiment, the method of producing the ICP comprises, in a first reactor system, contacting a catalyst composition with propylene, a first amount of a chain terminating agent and optionally ethylene or $C_4$ to $C_{12}$ α-olefins to form a polypropylene comprising no more than 5 wt %, by weight of the polypropylene, of ethylene or $C_4$ to $C_{12}$ α-olefin derived units; and in a second reactor system, contacting the catalyst composition, the polypropylene(s) from the first reactor system with propylene, ethylene, a second amount of a chain terminating agent, and optionally $C_4$ to $C_{12}$ α-olefins, wherein the second reactor system is equipped with a chain terminating agent removal slipstream to control the second amount of the chain terminating agent and/or to maintain the second amount of chain terminating agent below that of the first amount of chain terminating agent, to form ethylene-propylene copolymer comprising within the range from 35 or 40 or 45 to 60 or 65 or 70 wt %, by weight of the copolymer, of ethylene-derived units.

As used herein, a monomer circuit refers to the portion of a reactor system comprising the circuitous flow path or loop used to recirculate monomer discharged unreacted from a reactor(s) back to the reactor(s) in the reactor system, including the lines, valves, fluid drivers such as compressors, heat exchangers, reactor(s), etc. The material balance is maintained in the embodiment where the reactor system is operated in a steady state condition by introducing monomer(s), catalyst(s), polymer(s), and other feeds into the monomer circuit, and withdrawing polymer(s) and other product streams from the monomer circuit.

As used herein, a slipstream circuit refers to a parallel flow path or loop used to recirculate monomer in parallel with a portion of the monomer circuit between a take-off from the monomer circuit and a return to the monomer circuit, including the lines, valves, fluid drivers such as compressors, heat exchangers, chain terminating agent removal unit(s), or other processing units, etc., and also refers to a common portion of the monomer circuit between the return and the take-off to complete the loop. A slipstream circuit may optionally include treatment, fractionation, reaction, separation or other form of component(s) removal and/or addition such that the specific composition of the monomer stream in the slipstream circuit at the return may be different than that at the take-off.

In an embodiment, the process or process unit is used to make ICP having two or more polymer components, for example, a propylene impact copolymer comprising: (a) from about 80 to 99 wt % by weight hPP based on the total weight of the impact copolymer, wherein the hPP comprises 8% or less by weight of ethylene and/or $C_4$ to $C_{10}$ α-olefins, wherein the hPP is produced in the first reactor system, and (b) from about 1 to 20% by weight of EPR component based on the total weight of the ICP, the EPR comprising a propylene copolymer or terpolymer wherein the copolymer comprises from about 25 to 60% by weight of ethylene and/or $C_4$ to $C_{10}$ α-olefins, wherein the EPR is produced in the second reactor system, and (c) an IVR of from 2 to 10.

A variety of serial reaction methods and serial reactor systems may be used to prepare such impact copolymers among other types of polymers. For example, U.S. Pat. No. 5,698,642, which is hereby incorporated herein by reference, discloses a process for the gas-phase polymerization of olefins carried out in two interconnected polymerization systems, to which one or more α-olefins (CH═CHR) are fed in the presence of a catalyst under polymerization conditions and from which the produced polymer is discharged. The growing polymer particles flow through a first polymerization reactor system under fast fluidization conditions, e.g., a fast fluidization section, leave the first polymerization reactor system and enter a second polymerization reactor system through which they flow in a densified form under the action of gravity, e.g., a dense phase section, leave the second polymerization reactor system and are reintroduced into the first polymerization reactor system, thus establishing a circulation of polymer between the two polymerization systems. Such polymerization schemes are commonly referred to in industry as multi-zone circulating reactors or multi-zone circulating reactor systems. U.S. Pat. No. 5,698,642 also discloses that the multi-zone circulating reactor may be combined with other types of reactor systems such as in bulk or in the gas phase, either in a fluidized bed or a stirred bed in a sequential multi-stage processes (col. 9, lines 35-44). See also, e.g., U.S. Pat. No. 6,413,477 and U.S. Patent Application Publication No. 2002/0061264 A1, both of which are hereby incorporated herein by reference.

Upon exiting the first reactor system, the polypropylene in one embodiment is a slurry which may be transferred to the second reactor system in a transfer system whereby the propylene slurry is depressurized and flashed at a pressure that allows for recycle of the vaporized monomer by condensation using cooling water or other cooling means, and is sufficient for gas phase polymerization. The polypropylene and catalyst composition mixture is then transferred to a GPR in the second reactor system, wherein the GPR is disposed within a monomer circuit and is equipped with a chain terminating agent slipstream circuit. The elastomeric polymer component is produced in this GPR in certain embodiments. The elastomeric polymer, an ethylene-propylene copolymer in a particular embodiment, is produced in a particular embodiment by use of a fluidized bed gas phase reactor at operating temperatures within the range of from 50 or 60 to 80 or 100° C., and pressures within the range from 0.7 or 1.0 to 1.7 or 2.1 MPa (from 100 or 150 to 250 or 300 psi). Polymer exiting the polymerization section in one embodiment passes through a low pressure separator, in which the remaining monomer is separated for recycle, a steam treatment vessel for deactivation of the residual catalyst in certain embodiments, and then a small fluid bed dryer or other drying means in an embodiment.

The catalyst composition(s) can be any suitable catalyst composition known for polymerizing olefins to produce polyolefins and in one embodiment is a composition that can control the isotacticity of the propylene polymers that are produced. Non-limiting examples of suitable catalysts compositions include Ziegler-Natta catalysts, metallocene catalysts, chromium catalysts, metal-imide/amine coordination catalysts, and combinations of such catalysts each with its various suitable co-catalyst and/or electron donor or other modifying agent known in the art. An example of certain embodiments of catalyst compositions is described in WO 99/20663, describing a Ziegler-Natta catalyst composition using any one of a combination of aluminum alkyl donor systems. The selection of other conditions for producing the individual impact copolymer components and the whole propylene impact copolymer is reviewed by, for example, G. DiDrusco and R. Rinaldi in "Polypropylene Process Selection Criteria" in HYDROCARBON PROCESSING p. 113 (November 1984), and references cited therein.

In one embodiment, a plurality of reactor systems may be employed to produce impact copolymers. In any of the embodiments of this invention, polypropylene polymer may be produced in a first reactor system, e.g., with broadened molecular weight distribution and composition as described in for example, U.S. Pat. Nos. 5,698,642; 6,413,477; 7,816,447; 7,851,554; and U.S. Patent Application Publication 2002/0061264; upon transfer by one of the embodiments of this patent to a second reactor system a rubber phase may be incorporated within the polypropylene granule to produce ICPs having a rubber phase, e.g., with broadened molecular weight distribution and/or broadened ethylene concentration distribution as described in U.S. Pat. No. 7,816,447, or with a relatively high Mw or high IVR as described in U.S. Pat. No. 7,851,554.

In one embodiment, the ICP's produced can have a rubber phase with a relatively high molecular weight such that the IV ratio is high. For example, the process or process unit can be used to provide a relatively low chain terminating agent, e.g., hydrogen, concentration in at least one reactor or reaction zone in the second reactor system and other conditions conducive to high molecular weight polymerization to produce the rubber phase.

In an embodiment, a method is provided to control chain terminating agent levels in one or more of the reactor systems, and thereby produce an olefin impact copolymer having a controlled intrinsic viscosity (IV) ratio (IVR), for example a high IVR, in a process comprising producing a semi-crystalline polymer in a first reactor system, and transferring a product effluent stream from the first reactor system to a second reactor system comprising a recirculating monomer circuit to form a low crystallinity polymer in the presence of the semi-crystalline polymer, the method characterized by removing chain terminating agent from a slipstream circuit in recirculating communication with the monomer circuit.

In an embodiment, the present method and process unit employ a series reactor configuration. Utilizing the series reactor configuration, intimate product blending and integration are accomplished in the second polymerization reactor(s) itself when the effluent of the first polymerization reactor(s) system is fed into the second reactor system operating at different conditions with optionally different catalyst and monomer feed composition. Such reactor series configuration may be further expanded into more than a two-stage series configuration, e.g., three or more reactor systems in series. Generally, a series of n reactor systems may produce a blend with as many as n components or even more present in the effluent of the last reactor system. Note that in principle, more than n components may be produced and blended in n reactor systems by, for example, using more than one catalyst or by utilizing multiple zones operating at different conditions in one or more reactors of the series reactor cascade.

With reference to FIG. 1, a schematic flow diagram of a process 100 according to an embodiment comprises operation 102 to produce semi-crystalline polymer in a first reactor system, operation 104 to transfer a product effluent stream from the first reactor system to a second reactor system comprising a monomer circuit, operation 106 to remove molecular hydrogen or another chain terminating agent from a slipstream circuit in recirculating communication with the monomer circuit, and operation 108 to recirculate monomer in the monomer circuit through a reactor in the second reactor system to form a low crystallinity polymer in the presence of the semi-crystalline polymer.

Figure 2:
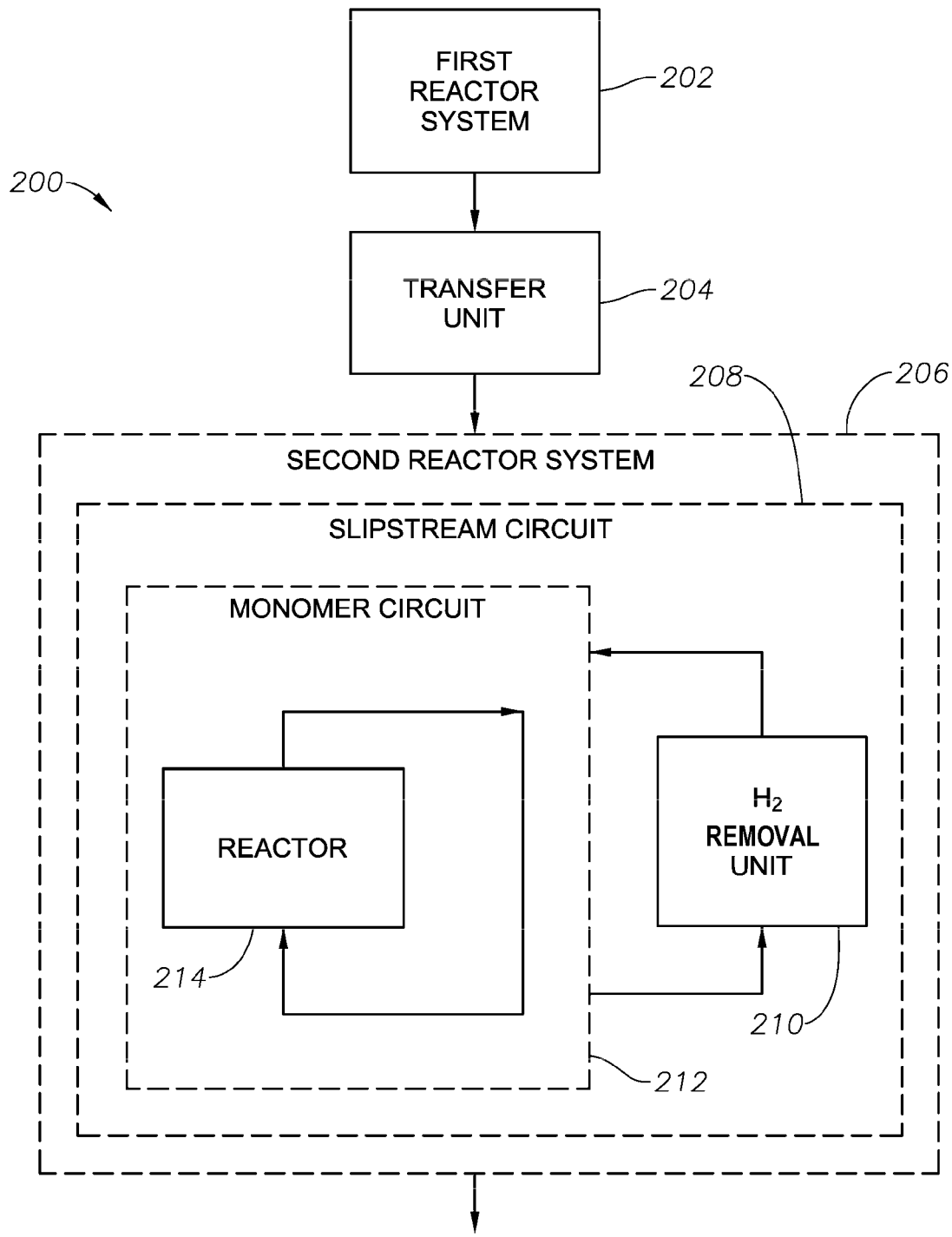
FIG. 2 is a schematic diagram of a process unit according to an embodiment.

With reference to FIG. 2, a schematic diagram of a process unit 200 according to an embodiment illustrates a first reactor system 202 to produce a semi-crystalline polymer, and a transfer unit 204 to transfer a product effluent stream from the first reactor system to a second reactor system 206 to form a low crystallinity polymer in the presence of the semi-crystalline polymer. The second reactor system 206 comprises a slipstream circuit 208 including a hydrogen removal unit 210 to remove molecular hydrogen from the second reactor system 206. The hydrogen removal unit 210 is disposed in recirculating communication with a monomer circuit 212 to recirculate monomer through a reactor 214 in the second reactor system 206.

Figure 3:
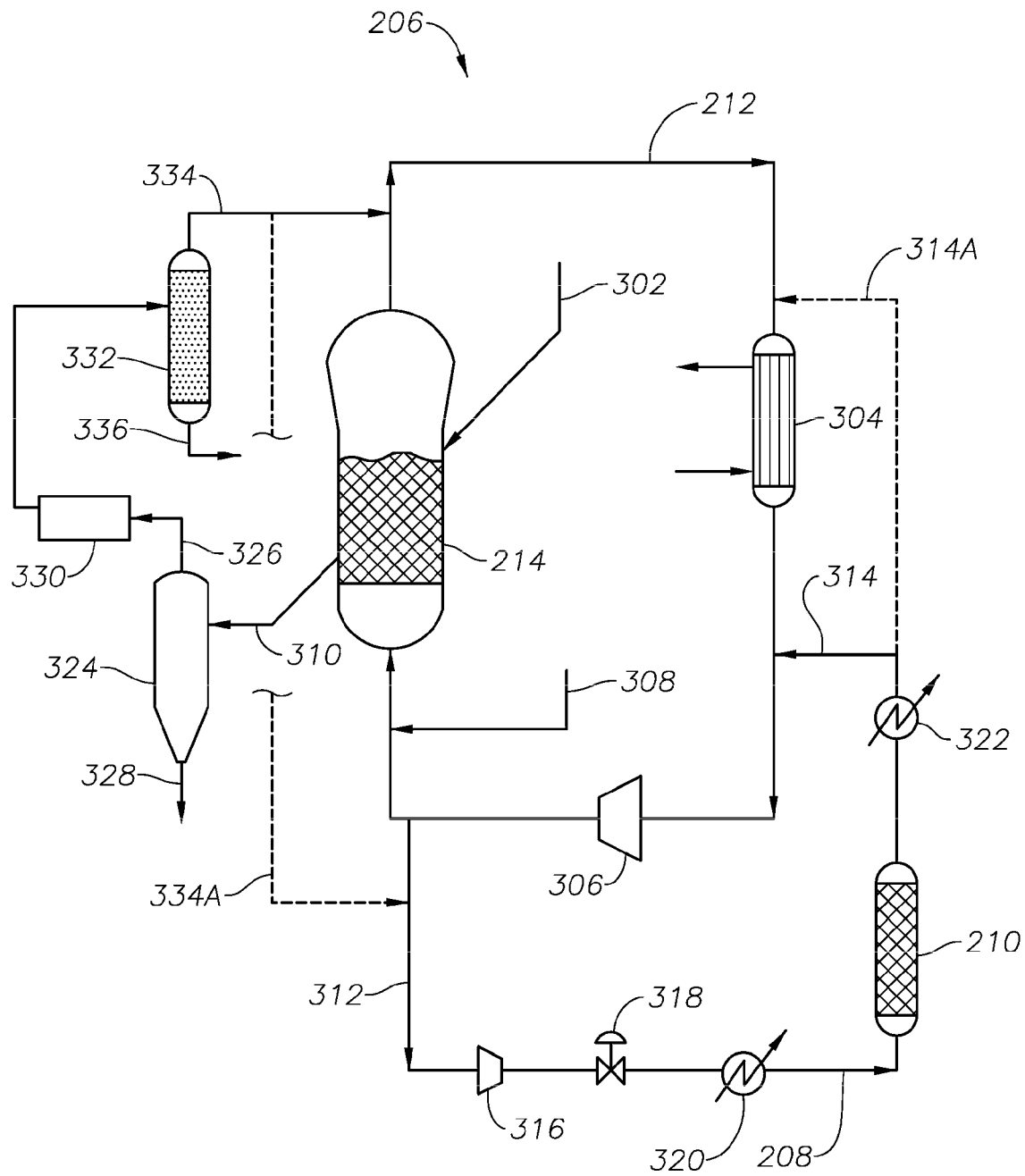
FIG. 3 is a schematic flow diagram of a second reactor system comprising a slipstream circuit with a hydrogen removal unit according to an embodiment.

With reference to FIG. 3, a schematic flow diagram of a second reactor system 206 according to an embodiment shows a polymerization reactor 214 in a monomer circuit 212, which in turn is disposed in a slipstream circuit 208. A polymer product received directly or indirectly from a first reactor system 202 (see FIG. 2) is supplied via line 302 to reactor 214, which may be a fluidized bed gas phase reactor according to an embodiment. The monomer circuit 212 may also include a heat exchanger 304 to control the temperature of the recirculating monomer, e.g., by supplying cooling water as an indirect heat transfer medium. The monomer circuit 212 may further include a fluid driver 306 to circulate the monomer at the desired flow rate and pressure, such as a compressor, high volume blower, or other suitable equipment. Fresh monomer may be supplied to the monomer circuit 212 via makeup line 308 as required for steady state operation of the reactor 214. Reactor effluent comprising polymer may be recovered via stream 310.

The slipstream circuit 208 in this embodiment includes the hydrogen removal unit 210, which may comprise any suitable system to remove molecular hydrogen, such as, for example, a membrane separator to selectively remove hydrogen, a hydrogen reactor system such as a catalytic hydrogenation reactor to hydrogenate an olefin in the slipstream circuit, thereby depleting the molecular hydrogen in the slipstream flow for return to the reactor system, or the like. As used herein, "removing" and similar expressions are intended broadly to encompass any operation to separate, react, sequester, or otherwise deplete the chain terminating agent such as molecular hydrogen that would be available to modify molecular weight of the polymer formed in the second reactor system.

In one embodiment the removal unit 210 comprises a hydrogenation reactor to remove the molecular hydrogen by hydrogenating the olefin monomer in the monomer circuit. The removal unit 210 in this embodiment comprises a hydrogenation catalyst bed and the slipstream circuit 208 is equipped with an optional compressor, temperature control systems, and scrubber/filter systems to ensure optimum operation of the hydrogenation catalyst. The hydrogenation catalyst is selected from available catalysts, such as Sud Chemie's POLYMAX 202 palladium catalyst, or a nickel based catalyst, or one or more other hydrogenation catalysts, to provide the desired hydrogen removal capability with robust operation, e.g., longevity, relatively "mild" operating conditions, etc., in the GPR environment, which may include polymer fines, catalyst components or residues, e.g., aluminum alkyls, and oligomers.

In another embodiment, the removal unit 210 comprises a membrane separator system to remove the hydrogen by size exclusion permeation of the membrane, e.g., a hydrogen-selective membrane. The removal unit 210 in this embodiment comprises a hydrogen selective permeation system and the slipstream circuit 208 is equipped with an optional compressor, temperature control systems, and scrubber/filter systems to ensure optimum operation of the membrane unit. The membrane is selected from available membranes known to provide the desired hydrogen removal capability with robust operation, e.g., longevity, relatively "mild" operating conditions, etc., in the GPR environment, which may include polymer fines, catalyst components or residues, e.g., aluminum alkyls and oligomers.

The slipstream circuit 208 may comprise a take-off 312 and a return 314 at any suitable points of the monomer circuit 212, including at reactor 214, upstream or downstream with respect to the heat exchanger 302, upstream or downstream from the fluid driver 306, etc. In various embodiments the slipstream circuit 208 may optionally include a compressor 316, flow controller 318, upstream heat exchanger 320, downstream heat exchanger 322, and like process control equipment to control the flow rate, pressure, temperature and other process variables for operation of the removal unit 210.

In one embodiment, the desired pressure and flow rate of the hydrogen-containing monomer stream supplied to the chain terminating agent removal unit 210 is conveniently obtained by locating the take-off 312 downstream of the fluid driver 306, the return upstream from the fluid driver 306, and increasing the rate of the fluid driver 306 by an appropriate level to account for the increased throughput into the slipstream circuit 208. In this configuration the compressor 316 may not be needed, and the flow rate controlled by proportionally opening or closing a flow control valve associated with the controller 318. Where the removal unit 210 effectively removes a proportion equal to or more than 80 or 90 percent of the molecular hydrogen in each pass through the slipstream circuit, for example, the volumetric rate of flow into the take-off 312 may comprise from 1 to 15 percent or from 2 to 10 percent of the flow rate through or from the fluid driver 306. In a retrofit application, an existing high volume blower 306 may be able to handle the additional rate for the slipstream circuit 208, or may be modified, supplemented with an additional fluid driver, or replaced for the additional flow capacity relative to a non-slipstream mode.

In one embodiment, where the removal unit 210 requires a temperature elevated with respect to that of the take-off 312, for example, where the removal unit comprises a catalyst bed, the upstream heat exchanger 320 may be present and comprise a preheater. Similarly, the downstream heat exchanger 322 may be present and comprise a cooler so that the return will have a temperature similar to that in the monomer circuit 312 at the point of the return 314. In one embodiment, the parallel flow path portion of the slipstream circuit 208 comprises an additional and/or alternate return 314A located upstream from the monomer circuit heat exchanger 304, so that the slipstream return 314A is conveniently cooled therein with the rest of the monomer circuit flow from the reactor 214, and the downstream heat exchanger may be of a relatively reduced cooling capacity or eliminate altogether.

In one embodiment, the reactor effluent stream 310 is supplied to a solid-gas separator 324 that recovers a vapor stream 326 overhead and a vapor-lean polymer product stream 328, which may be further degassed, mixed with additives, colorants, fillers or the like and otherwise finished as desired. In one particular embodiment, the recovered vapor stream 326 may be pressurized as required via reciprocating compressor 330 and fractionated in de-ethenizer 332 to obtain a recycled monomer stream 334 and a $C_3$-rich stream 336, which may be recycled as monomer to the first reactor system 202 (see FIG. 2). The recycled monomer stream 334 may be returned to the monomer circuit 212 in the line between the reactor 214 and the fluid driver 306, or, especially if it may contain molecular hydrogen at a relatively higher concentration than the bulk monomer circuit 212 stream from the reactor 214, may comprise an additional and/or alternate take-off line 334A directly into the slipstream circuit 208.

In another embodiment, the transfer unit 204 may comprise a batch transfer system for conveying product from the first reactor system 202 into the second reactor system 206 with minimal transfer of monomer and/or hydrogen. In one embodiment, the product produced in the first reactor system 202 is withdrawn continuously or batchwise and conveyed by means of differential pressure to a gas-solids separation vessel, where the molten or solid product accumulates in the bottom of the vessel and the monomer that separates from the molten or solid product is withdrawn from the vessel and may optionally be filtered or otherwise treated and optionally recompressed for recovery and/or recirculation to the first reactor system 202. In this embodiment, the accumulated product in the separation vessel may then be transferred by differential pressure and/or gravity directly to the second reactor system 206; or optionally, to a low pressure separator which can be optionally vented to a lower pressure to remove additional volatile components and the molten or solid product then transferred by differential pressure and/or gravity directly to the second reactor system 206, e.g., by re-pressurizing the low pressure separator with monomer, hydrogen, inert gas or otherwise, to a sufficient level to provide a positive differential pressure between the low pressure separator and the second reactor system.

Figure 4:
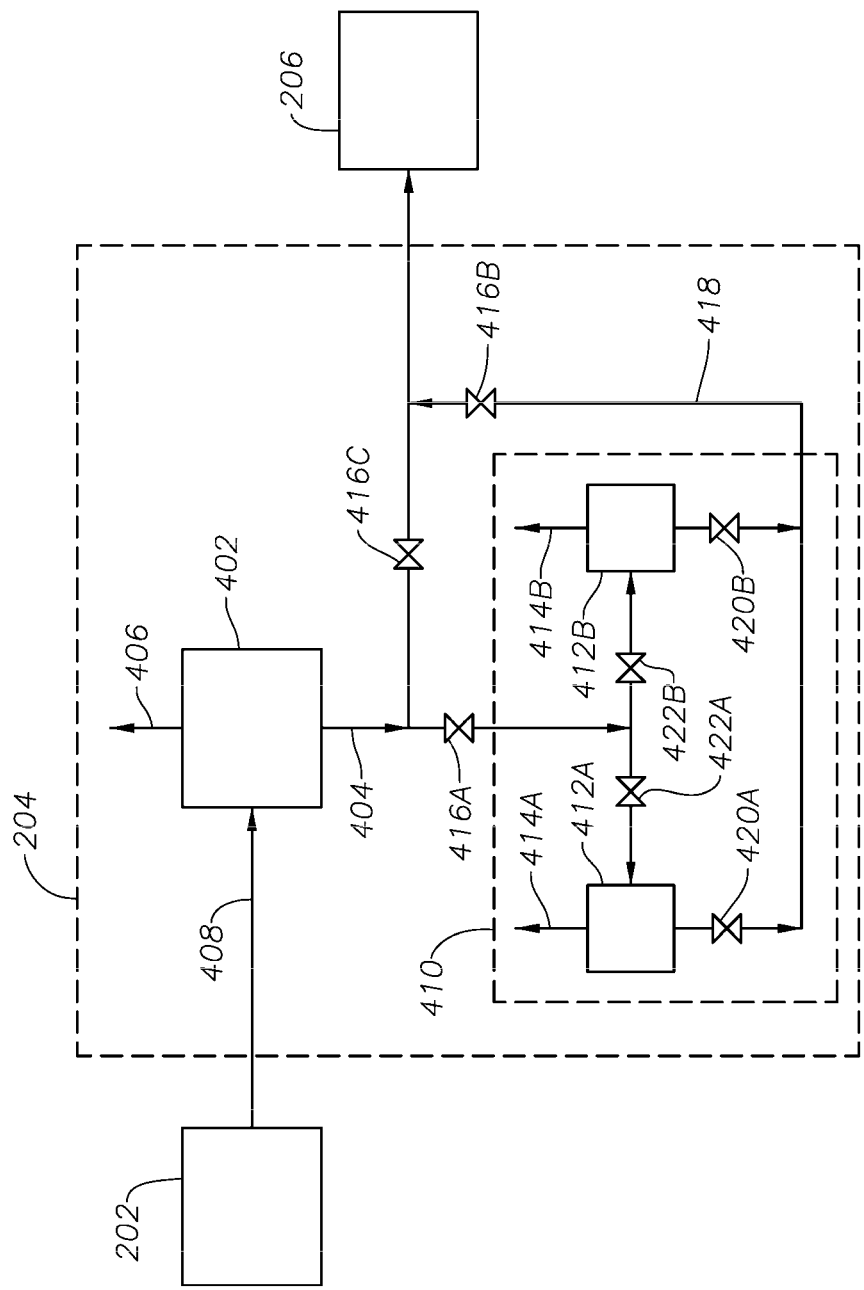
FIG. 4 is a schematic diagram of a transfer unit between the first and second reactor systems, respectively.

With reference to FIG. 4, the transfer unit 204 disposed serially between the first reactor system 202 and the second reactor system 206 in one embodiment comprises a high pressure separator 402. As used herein, a "high pressure separator" is one that operates or is designed to operate during a separation mode at a pressure above the operating pressure of at least one or more of the reactor(s) in the second reactor system 206 such that a monomer-lean stream 404 could be introduced directly into the second reactor system 206 without the aid of a pump or re-pressurization, whereas a "low pressure separator" is one that is operated during a separation mode at a pressure below that of a high pressure separator. The high pressure separator 402 separates and recovers a vapor phase stream 406 from the polymer effluent stream 408, which in an embodiment may be recycled to the first reactor system 202. The high pressure separator 402 in one embodiment is operated continuously, but may also be operated on a batch, semi-batch or semi-continuous basis or some combination thereof in other embodiments.

The vapor phase stream 406 may contain some hydrogen, but some hydrogen may also be entrained in the monomer-lean stream 404. The monomer-lean stream 404 may be fed directly to the second reactor system 206, or may optionally be processed in a low pressure separator system 410, if present in the process unit or otherwise available. In one embodiment, the low pressure separator system 410 may include one or more low pressure separators 412A, 412B, which may flash additional vapor 414A, 414B, respectively, from the monomer-lean stream 404 at a lower pressure than that of the high pressure separator 402 and thus remove additional volatile components including hydrogen. Although two low pressure separators 412A, 412B, are illustrated in the specific embodiment of FIG. 4, either one or three or more may also be employed. The low pressure separators 412A, 412B may be operated continuously using a pump (not shown) or other means to re-pressurize the polymer stream 418 sufficiently for feed to the second reactor system 206. In one embodiment, the low pressure separators 412A, 412B are operated in an alternated semi-batch, semi-continuous mode by feeding polymer stream 404 via valves 422A, 422B into a first one of the low pressure separators 412A, 412B in a vapor separation mode with the separator isolated via a respective one of the valves 420A, 420B until the separator is at least partially filled with vapor lean polymer; then switching the polymer feed to another one of the separators via valves 422A, 422B, pressurizing the at least partially filled separator, e.g., with an inert gas or monomer pad (not shown), and opening the respective one of the valves 420A, 420B to transfer the pressurized monomer lean polymer from the low pressure separator into the second reactor system 206.

The low pressure separator system 410 in one embodiment may be employed to reduce the amount of hydrogen that needs to be removed in the slipstream circuit 208 (see FIGS. 2 and 3). In another additional or alternative embodiment, the low pressure separator system 410 may be employed as a primary means of hydrogen removal for the second reactor system 206, and the slipstream circuit 208 may be used to more quickly reach steady state operation of the second reactor system 206 and/or to more precisely control the hydrogen levels and thus molecular weight and IVR, thereby minimizing the transition time and off-spec production between high IVR operating mode and moderate or low IVR operating mode. In one embodiment, isolation valves 416A, 416B are opened and isolation valve 416C closed in whole or in part to selectively bring the low pressure separator system 410 on line for high IVR operation mode, and vice versa for non-high IVR operation mode.

In an embodiment, the ICP produced comprises at least two "unbalanced" polypropylenes and at least one elastomeric polymer. In another embodiment, the polypropylene matrix comprises at least two polypropylenes having unbalanced MFRs as described in U.S. Pat. No. 7,851,554, which is hereby incorporated herein by reference. In an embodiment, the process or process unit is used to make ICP having three or more polymer components such as those described in U.S.

Pat. No. 7,816,447, which is hereby incorporated herein by reference, for example, a propylene impact copolymer comprises: (a) from about 40 to 98 wt % by weight Component A based on the total weight of the impact copolymer, Component A comprising propylene homopolymer or copolymer wherein the copolymer comprises 8% or less by weight of ethylene and/or $C_4$ to $C_{10}$ α-olefins, (b) from about 1 to 40% weight of Component B based on the total weight of the impact copolymer, Component B comprising a propylene copolymer or terpolymer comprising from about 35% to about 100% by weight of ethylene and/or $C_4$ to $C_{10}$ α-olefins, and (c) from about 1 to 20% by weight of Component C based on the total weight of the impact copolymer, component C comprising a propylene copolymer or terpolymer wherein the copolymer comprises from about 25 to 60% by weight of ethylene and/or $C_4$ to $C_{10}$ α-olefins.

The at least two polypropylenes in this embodiment may be homopolymers of polypropylene, propylene based copolymers, or combinations of the two. The isotacticity of the first and second polypropylenes (if present as described herein) may be the same or different. In certain embodiments, the at least two unbalanced polypropylenes comprise a first polypropylene made in a first reactor having an $MFR^1$ and a second polypropylene made in a second reactor within the first reactor system having an $MFR^2$; wherein the ratio $MFR^2/MFR^1$ is greater than 1.5 or 2 or 2.5.

In particular embodiments, the ICP comprises first and second polypropylenes made in the first reactor system and an elastomeric polymer made in the second reactor system; the first polypropylene having an $MFR^1$ within the range from 8 or 15 or 18 to 35 or 40 dg/min; the second polypropylene having an $MFR^2$ within the range from 50 or 65 to 100 or 190 dg/min. In certain embodiments, the first, or second, or both polypropylenes are propylene copolymers comprising within the range from 0.1 to 5 wt %, by weight of the copolymer, of ethylene or $C_4$ to $C_{12}$ α-olefin derived units. In other embodiments, the first, or second, or both polypropylenes are propylene homopolymers. The ICP comprises within the range from 30 or 40 to 60 or 70 wt %, by weight of the propylene impact copolymer, of the first polypropylene in one embodiment. The ICP comprises within the range from 10 or 20 to 30 or 40 wt %, by weight of the propylene impact copolymer, of the second polypropylene in another embodiment. Described another way, the polypalles are present in the ICP such that the $MFR^2/MFR^1$ is within the range from 2 or 2.5 or 3 to 4 or 4.5 or 5 or 6. This may be achieved by any means such as by adjusting the relative amounts of each polypropylene in the impact copolymer, adjusting the MFR of each polypropylene in the impact copolymer (by, for example, changes in the catalyst composition in going from one reactor to another), or both.

In a particular embodiment, the at least first and second polypropylenes have a collective $IV_{PP}$ and the IVR is within the range from a lower limit of 1 or 1.50 or 1.75 or 1.80 or 2.70 or 3 or 4 or 5 or 6 to a higher upper limit selected from 1.50 or 1.75 or 1.80 or 2.70 or 3 or 4 or 5 or 6 or 7 or 8 or 9 or 10, e.g., 1.5 to 2.7, 2.7 to 5, 5 to 9, 7 to 10, or the like.

In a particular embodiment, the ICP is produced in-situ within three reactors, wherein the first polypropylene is produced in a first reactor and the second polypropylene is produced in a second reactor in a first reactor system, and the elastomeric polymer is produced in a third reactor in the second reactor system comprising a slipstream circuit to remove chain terminating agent, each reactor associated in series. In yet another particular embodiment, the ICP is produced in-situ within the three reactors in the two reactor systems, wherein the first polypropylene is produced in the first reactor with a first catalyst composition and the second polypropylene is produced in the second reactor with a second catalyst composition, wherein the first and second catalyst compositions differ from one another, and the elastomeric polymer is produced in the third reactor associated with a slipstream circuit to remove chain terminating agent, each reactor associated in series. The catalyst composition may be modified by changing the identity and/or amount of the transition metal component or the electron donors and/or co-catalysts used in conjunction with the transition metal component. An embodiment of a catalyst composition arrangement is disclosed in WO 99/20663 A2, wherein sequential electron donors are used to modify the catalyst composition from one reactor to another, the sequential donors being different compounds or mixtures of compounds. For example, a titanium-magnesium based Ziegler-Natta catalyst composition may be used in all of the reactors, the same titanium-magnesium composition in a particular embodiment, but the aluminum-alkoxy/alkyl "electron donor" compound used in the first reactor may be different than the aluminum-alkoxy/alkyl compound used in the second reactor, or alternatively, the ratios of a mixture of aluminum-alkoxy/alkyl compounds may be changed in going from the first to the second reactor. In this manner, the isotacticity and/or MFR of the first and second polypropylenes can be tailored.

In embodiments where one or more reactors are used to produce the propylene impact copolymer(s), chain terminating agent(s) (e.g., hydrogen) may be used in the first reactor system to control the MFR (i.e., molecular weight) of the polypropylene(s). The chain terminating agents may be used as a means of adjusting the MFR of components of the ICP either alone or in conjunction with other means. In a particular embodiment, the method of producing the ICP comprises, in a first reactor system, contacting a catalyst composition with propylene, a first amount of a chain terminating agent and optionally ethylene or $C_4$ to $C_{12}$ α-olefins in the first reactor to form a first polypropylene comprising no more than 5 wt %, by weight of the first polypropylene, of ethylene or $C_4$ to $C_{12}$ α-olefin derived units; followed by contacting the catalyst composition and first polypropylene with propylene, a second amount of a chain terminating agent and optionally ethylene or $C_4$ to $C_{12}$ α-olefins in the second reactor to form a second polypropylene comprising no more than 5 wt %, by weight of the second polypropylene, of ethylene or $C_4$ to $C_{12}$ α-olefin derived units, wherein the second amount of chain terminating agent is greater than the first amount of chain terminating agent; and, finally, in the second reactor system, contacting the catalyst composition, first polypropylene and second polypropylene in a third reactor with propylene, ethylene, a third amount of a chain terminating agent, and optionally $C_4$ to $C_{12}$ α-olefins, wherein the second reactor system is equipped with a chain terminating agent removal slipstream to control the third amount of the chain terminating agent and/or to maintain the third amount of chain terminating agent below that of the second amount of chain terminating agent, to form ethylene-propylene copolymer comprising within the range from 35 or 40 or 45 to 60 or 65 or 70 wt %, by weight of the copolymer, of ethylene-derived units.

In one embodiment, the first amount of chain terminating agent is added to the one or more reactors and/or one or more stages within a reactor(s) such that the first polypropylene has an $MFR^1$ within the range from 8 or 15 or 18 to 35 or 40 dg/min. The second amount of chain terminating agent is added in certain embodiments such that the second polypropylene has an $MFR^2$ within the range from 50 or 65 or 70 to 100 or 120 or 190 dg/min. The third amount of chain terminating agent is controlled in the second reactor system such that the ICP has an IVR of greater than 1, or equal to or greater than 1.5, 1.75, 1.8, 2, 2.1, 2.15, 2.2, 2.25, 2.3, 2.5, 2.7, 3, 3.5, 4, 4.5, 5, 5.5, 6, 6.5, 7, 7.5, 8, 8.5, 9, 9.5, or 10. Described another way, the second amount of chain terminating agent in certain embodiments is greater than the first amount of chain terminating agent such that the $MFR^1$ of the first polypropylene is at least 30 or 40 or 50% less than the $MFR^2$ of the second polypropylene, and/or the third amount of chain terminating agent is less than the second amount of chain terminating agent such that the IVR of the ICP is equal to or greater than 2.1, 2.15, 2.2, 2.25, 2.3, 2.5, 2.7, 3, 3.5, 4, 4.5, 5, 5.5, 6, 6.5, 7, 7.5, 8, 8.5, 9, 9.5, or 10. Stated in yet another way, the chain terminating agents are added to the reactor(s) such that the $MFR^2/MFR^1$ is within the range from 2 or 2.5 or 3 to 4 or 4.5 or 5 or 6 in certain embodiments, and greater than 1.5 or 2.0 or 2.5 or 3.0 in other embodiments.

The amount of chain terminating agent can be varied by any suitable means in the reactor(s) in the first reactor system, and in one embodiment the amount of the first chain terminating agent is less than 2000 or 1800 mol ppm as measured in the propylene feed to the reactor; the amount of the second chain terminating agent is greater than 2500 or 2800 mol ppm as measured in the propylene feed to the reactor; and the amount of third chain terminating agent is less than 5000 mol ppm or less than 2500 mol ppm, as measured in the monomer feed to the reactor.

In a particular embodiment, the first and second reactors in the first reactor system are slurry-loop reactors and the third reactor in the second reactor system is a gas phase reactor. The first and second reactors produce the polypropylenes in the first reactor system, homopolymers in a particular embodiment, and the GPR produces the elastomeric polymer in another embodiment, thus creating an in-situ blend of elastomer in a polypropylene matrix. As described above, the ICP may comprise within the range from 30 or 40 to 60 or 70 wt %, by weight of the ICP, of the first polypropylene; within the range from 10 or 20 to 30 or 40 wt %, by weight of the ICP, of the second polypropylene; and within the range from 15 or 20 or 22 to 26 or 30 or 35, by weight of the ICP, of the elastomeric copolymer. These amounts are achieved, in the case where two or more reactor systems are used to produce the ICP, by any suitable means known to those skilled in the art including control of the residence time in each stage and/or reactor, amount and/or identity of the catalyst composition(s), variation in the reactants in each stage and/or reactor (i.e., propylene, comonomer, hydrogen, etc.), combinations of these, or other means.

In certain embodiments of the two-system, three-reactor process, catalyst components, propylene, chain terminating agent and any other optional monomers are fed to a first loop reactor for a first homopolymerization or copolymerization process. The high heat removal capability of the loop reactors, resulting from the turbulent mixing of the slurry and the large surface-to-volume ratio of the reactor, enables high specific outputs. Operating conditions are typically in the range of 60 to 80° C., 3.45 to 4.83 MPa (500 psi to 700 psi) of pressure, and an amount of chain terminating agent, hydrogen of less than 2000 or 1800 mol ppm as measured in the propylene feed to the reactor, and within the range from 1000 or 1100 to 1200 or 1800 or 2000 mol ppm in another embodiment. The polymer produced from the first reactor (along with residual chain terminating agent and monomers) is then transferred to a second loop reactor where the operating conditions may be the same or different. Additional monomer, chain terminating agent, and optional comonomer may be added also. In a particular embodiment, at least the amount of the second chain terminating agent will be different, wherein the amount of chain terminating agent, hydrogen in a particular embodiment, is greater than 2500 or 2800 mol ppm as measured in the propylene feed to the second reactor, and within the range from 2500 or 3000 or 3400 to 3600 or 4000 mol ppm in another embodiment.

The ICP can be formed by any suitable means into articles of manufacture such as automotive components, pallets, crates, cartons, appliance components, sports equipment and other articles that would benefit from high impact resistance and low creep. In a particular embodiment, the propylene impact copolymers described herein are formed into pallets, and are injection molded into pallets in a particular embodiment.

Accordingly, the following embodiments are provided:

A. A process for making a copolymer, the process comprising:
   (a) producing in a first reactor system a first product stream comprising a semi-crystalline polymer and a chain terminating agent;
   (b) providing at least a portion of the first product stream to a second reactor system;
   (c) producing in the second reactor system a low crystallinity polymer in the presence of the semi-crystalline polymer; and
   (d) removing at least a portion of the chain terminating agent introduced with the first product stream from the second reactor system by an in-situ process.

B. The process of embodiment A, wherein the in-situ process comprises a catalytic hydrogenation reactor to consume hydrogen via reaction with monomer, or a membrane unit to selectively remove the chain terminating agent from the reaction system.

C. The process of embodiment A or B, wherein the copolymer has an intrinsic viscosity ratio of greater than 4.

D. The process of any one of embodiments A-C, wherein the chain terminating agent is hydrogen.

E. The process of any one of embodiments A-D, wherein the monomer is selected from ethylene and propylene.

F. The process of any one of embodiments A-E, wherein the semi-crystalline polymer has a matrix, and at least a portion of the low crystallinity polymer is formed within the pores of the matrix.

G. The process of any one of embodiments A-F, wherein the semi-crystalline polymer is polypropylene homopolymer and the low crystallinity polymer is ethylene propylene rubber (EPR).

H. The process of any one of embodiments A-G, wherein the first reactor system comprises a slurry loop reactor or a plurality of slurry loop reactors in series communication and wherein the second reactor system comprises a fluidized gas phase reactor.

I. A process for making a copolymer, the process comprising:
   a) producing a product stream comprising a semi-crystalline polymer and a chain terminating agent in a first reactor system;
   b) transferring at least a portion of the product effluent stream from the first reactor system to a second reactor system comprising a monomer circuit to form a low crystallinity polymer in the presence of the semi-crystalline polymer; and
   c) removing at least a portion of the chain terminating agent from a slipstream circuit in recirculating communication with the monomer circuit.

J. The process of embodiment I, comprising catalytic hydrogenation of monomers in the slipstream circuit.

K. The process of embodiment I or J, comprising at least one of (a) controlling temperature and flow rate of the slipstream circuit; and compressing the monomer in the slipstream circuit.

L. The process of any one of embodiments I-K, comprising continuously separating monomers from the first reactor product effluent stream at a pressure greater than the second reactor system.

M. The process of any one of embodiments I-L, comprising operating a cycle transfer system to semi-continuously transfer the semi-crystalline polymer into the second reactor system.

N. The process of any one of embodiments I-M, comprising degassing a product effluent stream from the second reactor system to recover monomer and obtain an impact copolymer product stream, and recycling at least a fraction of the recovered monomer to the second reactor system.

O. The process of any one of embodiments I-N, comprising fractionating the recovered monomer to obtain an ethylene-rich fraction and returning the ethylene rich fraction to the monomer circuit or the slipstream circuit.

P. The process of any one of embodiments I-O, comprising removing hydrogen from the ethylene-rich fraction and returning the hydrogen-lean, ethylene rich fraction to the monomer circuit or the slipstream circuit.

Q. The process of any one of embodiments I-P, wherein the monomer circuit comprises a recirculating monomer stream to the second reactor system comprising less than about 0.5 mole percent molecular hydrogen based on the total moles in the recirculating monomer stream to the second reactor system to obtain an olefin impact copolymer comprising an intrinsic viscosity ratio equal to or greater than about 4.

R. The process of any one of embodiments I-Q, wherein the slipstream circuit has a mass flow rate from the monomer circuit less than or equal to about 10% of a mass flow rate of the monomer circuit based on the mass flow rate of the monomer circuit at a take-off to the slipstream circuit.

S. A method to control hydrogen levels and thereby produce a high IV ratio olefin impact copolymer in a process comprising producing a semi-crystalline polymer in a first reactor system, and transferring a product effluent stream from the first reactor system to a second reactor system comprising a recirculating monomer circuit to form a low crystallinity polymer in the presence of the semi-crystalline polymer, the method comprising removing molecular hydrogen from a slipstream circuit in recirculating communication with the monomer circuit.

T. A process unit, comprising a first reactor system to produce a semi-crystalline polymer, a transfer unit to transfer a product effluent stream from the first reactor system to a second reactor system to form a low crystallinity polymer in the presence of the semi-crystalline polymer, a monomer circuit to recirculate monomer through a reactor in the second reactor system, and a slipstream circuit comprising a chain terminating agent removal unit in recirculating communication with the monomer circuit to remove chain terminating agent from the second reactor system.

U. The process unit of embodiment T, wherein the chain terminating agent removal unit comprises a membrane separator to remove hydrogen or a catalytic hydrogenation reactor.

V. The process unit of embodiment T or U, wherein the transfer unit comprises at least one of: (i) a separator vessel to separate monomer(s) from the first reactor product effluent stream at a pressure greater than the second reactor system, and (ii) a cycle transfer system to semicontinuously transfer the semi-crystalline polymer into the second reactor system.

W. The process unit of any one of embodiments T-V, comprising a solid-gas separator to degas a product effluent stream from the second reactor system to recover monomer and an impact copolymer product stream, and a unit to recycle at least a fraction of the recovered monomer to the second reactor system.

X. The process unit of any one of embodiments T-W, comprising a line to supply the recovered monomer to the second reactor system via the slipstream circuit.

Y. The process unit of any one of embodiments T-X, comprising a de-ethenizer to fractionate the recovered monomer to obtain an ethylene-rich fraction and a line to recycle the ethylene-rich fraction to the second reactor system via the monomer circuit.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A process for making a copolymer, the process comprising:
   a) producing a product stream comprising a semi-crystalline polymer and a chain terminating agent in a first reactor system;
   b) transferring at least a portion of the product effluent stream from the first reactor system to a second reactor system comprising a monomer circuit to form a low crystallinity polymer in the presence of the semi-crystalline polymer; and
   c) removing at least a portion of the chain terminating agent from a slipstream circuit in recirculating communication with the monomer circuit.

2. The process of claim 1 comprising catalytic hydrogenation of monomers in the slipstream circuit.

3. The process of claim 1, comprising at least one of (a) controlling temperature and flow rate of the slipstream circuit; and compressing the monomer in the slipstream circuit.

4. The process of claim 1, comprising continuously separating monomers from the first reactor product effluent stream at a pressure greater than the second reactor system.

5. The process of claim 1, comprising operating a cycle transfer system to semi-continuously transfer the semi-crystalline polymer into the second reactor system.

6. The process of claim 1, comprising degassing a product effluent stream from the second reactor system to recover monomer and obtain an impact copolymer product stream, and recycling at least a fraction of the recovered monomer to the second reactor system.

7. The process of claim 6, comprising fractionating the recovered monomer to obtain an ethylene-rich fraction and returning the ethylene rich fraction to the monomer circuit or the slipstream circuit.

8. The process of claim 7, comprising removing hydrogen from the ethylene-rich fraction and returning the hydrogen-lean, ethylene rich fraction to the monomer circuit or the slipstream circuit.

9. The process of claim 1, wherein the monomer circuit comprises a recirculating monomer stream to the second reactor system comprising less than about 0.5 mole percent molecular hydrogen based on the total moles in the recirculating monomer stream to the second reactor system to obtain an olefin impact copolymer comprising an intrinsic viscosity ratio equal to or greater than about 4.

10. The process of claim 1, wherein the slipstream circuit has a mass flow rate from the monomer circuit less than or equal to about 10% of a mass flow rate of the monomer circuit based on the mass flow rate of the monomer circuit at a take-off to the slipstream circuit.

11. A method to control hydrogen levels and thereby produce a high IV ratio olefin impact copolymer in a process comprising producing a semi-crystalline polymer in a first reactor system, and transferring a product effluent stream from the first reactor system to a second reactor system comprising a recirculating monomer circuit to form a low crystallinity polymer in the presence of the semi-crystalline polymer, the method comprising removing molecular hydrogen from a slipstream circuit in recirculating communication with the monomer circuit.

12. A process unit, comprising a first reactor system to produce a semi-crystalline polymer, a transfer unit to transfer a product effluent stream from the first reactor system to a second reactor system to form a low crystallinity polymer in the presence of the semi-crystalline polymer, a monomer circuit to recirculate monomer through a reactor in the second reactor system, and a slipstream circuit comprising a chain terminating agent removal unit in recirculating communication with the monomer circuit to remove chain terminating agent from the second reactor system.

13. The process unit of claim 12, wherein the chain terminating agent removal unit comprises a membrane separator to remove hydrogen or a catalytic hydrogenation reactor.

14. The process unit of claim 12, wherein the transfer unit comprises at least one of: (i) a separator vessel to separate monomer(s) from the first reactor product effluent stream at a pressure greater than the second reactor system, and (ii) a cycle transfer system to semi continuously transfer the semi-crystalline polymer into the second reactor system.

15. The process unit of claim 12, comprising a solid-gas separator to degas a product effluent stream from the second reactor system to recover monomer and an impact copolymer product stream, and a unit to recycle at least a fraction of the recovered monomer to the second reactor system.

16. The process unit of claim 15, comprising a line to supply the recovered monomer to the second reactor system via the slipstream circuit.

17. The process unit of claim 15, comprising a de-ethenizer to fractionate the recovered monomer to obtain an ethylene-rich fraction and a line to recycle the ethylene-rich fraction to the second reactor system via the monomer circuit.

* * * * *